United States Patent [19]

Sutton et al.

[11] 4,343,849

[45] Aug. 10, 1982

[54] EDGE TREATMENT FOR FIBREBOARD PANELS AND THE LIKE

[75] Inventors: Roger F. Sutton, St. Charles; Robert O. Blomquist, Mt. Prospect; Allan J. Luck, Marengo, all of Ill.

[73] Assignee: Masonite Corporation, Chicago, Ill.

[21] Appl. No.: 21,245

[22] Filed: Mar. 15, 1979

Related U.S. Application Data

[62] Division of Ser. No. 848,142, Nov. 3, 1977, Pat. No. 4,197,078.

[51] Int. Cl.³ ................................................ B32B 3/02
[52] U.S. Cl. .................................. 428/157; 428/171; 428/192; 428/194; 428/207
[58] Field of Search ............... 264/118, 119, 330, 252, 264/259, 279, 120, 126, 248, 250, 320; 428/151, 206, 173, 326, 157, 171, 194, 192, 207; 156/62.2, 220

[56] References Cited

U.S. PATENT DOCUMENTS

| | | | |
|---|---|---|---|
| 3,247,047 | 4/1966 | Buckley | 428/151 |
| 3,268,642 | 8/1966 | Hutter | 264/120 |
| 3,283,052 | 11/1966 | Munk | 264/248 |
| 3,444,859 | 5/1969 | Kalwaites | 428/171 |
| 3,491,176 | 1/1970 | Walhstrom | 264/252 |
| 3,960,636 | 6/1976 | Moffitt | 264/248 |
| 4,007,076 | 2/1977 | Clarke et al. | 264/119 |

*Primary Examiner*—Stanley S. Silverman
*Attorney, Agent, or Firm*—Mason, Kolehmainen, Rathburn & Wyss

[57] ABSTRACT

Fibreboard panels and the like, useful as drawer fronts, cabinet doors, table tops, furniture parts, moldings, baseboards and the like are formed of compressed fibre panels or strips with an edge treatment forming a contoured or profiled edge surface. The wood fibres on the edge surface are heat seared and die pressed together to form a heat seared sealed surface of skin which does not require subsequent filling and further mechanical surfacing and which is more easily finished by the application of liquid decorating materials, paints, stains, printing inks and various colorants. The cellulosic fibrous blanks are mechanically pre-shaped to provide a contoured profile edge which is subjected to heat and pressure from a heated die which sears and seals together the fibres forming a skin over the profiled edge surface. The skin formation results in a reduction of time and labor that is required for any final finishing operations and provides a better appearance for the entire surface of the fibreboard piece.

11 Claims, 4 Drawing Figures

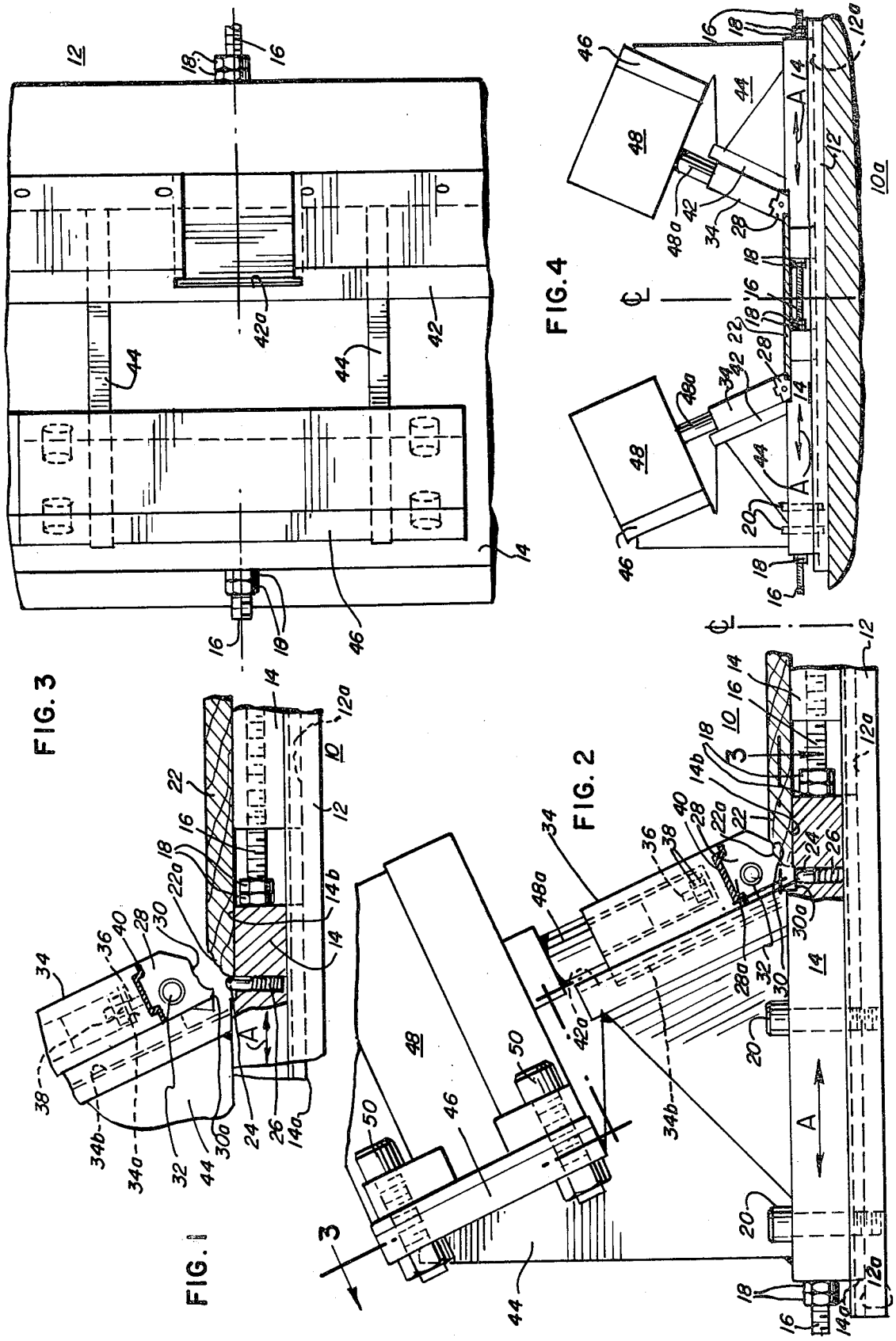

EDGE TREATMENT FOR FIBREBOARD PANELS AND THE LIKE

This is a division of copending application Ser. No. 848,142, filed Nov. 3, 1977 now U.S. Pat. No. 1,497,078.

BACKGROUND OF THE INVENTION

1. Field of the Invention

The present invention relates to edge treatment for fibreboard panels and the like and more particularly relates to the production of fibreboard panels having contoured profiled edges for use as drawer fronts, table tops, furniture tops, cabinet doors, shelves, baseboards, panel edging, door and window trims and a wide variety of other uses. The present invention is closely related to a copending application Ser. No. 833,037, filed Sept. 14, 1977 now U.S. Pat. No. 4,175,106, entitled Post Press Molding of Man Made Boards to Produce Contoured Furniture Parts, and this copending application is owned by the Assignee of the present invention and application.

2. Description of the Prior Art

Prior art systems using medium and high density fibreboard and particle board for furniture applications such as drawer fronts, etc. and for other applications wherein a profiled edge surface is desired, have mechanically preshaped a profiled edge surface with a router or shaping machine. This type of edge treatment almost universally necessitates a hand operation of filling and then sanding the mechanically shaped profiled edge before further finishing operations can be conducted because of the voids in the material, particularly particle board. In many instances, the amount of hand labor required offsets the other advantages afforded by the use of hardboard or fibreboard rather than natural wood. In addition, the man-made boards often produce a finished product which is not aesthetically appealing and which is definitely discernable to the observer as being a substitute or imitation rather than real wood. Because of the extensive amount of hand filling labor and additional edge surface treatment that was required, prior art systems were limited in application to usages wherein the appearance factor was not paramount.

Accordingly, it is an object of the present invention to provide a new and improved edge treatment for fibreboard panels and the like and more particularly it is an object to provide a new and improved edge treatment which greatly reduces the amount of labor required for finishing operations on a contoured profiled edge of a panel or the like formed of man-made fibreboard.

More particularly, it is an object of the present invention to provide a new and improved edge treatment of the character described which eliminates the need for hand filling and sanding of the profiled edge after the initial pre-shaping operation has been completed.

Yet another object of the present invention is to provide a new and improved edge treatment of the character described which produces a sealed skin over the surface which prevents a process known as "wicking" or "strike in" from occurring when subsequently sealers or other decorative pigments or inks are applied in a finishing operation.

Another object of the invention is to provide a new and improved edge treatment for the contoured profiled edges of fibreboard panels and the like, which treatment greatly increases the "paint hold out" characteristics of the edge surfaces.

Still another object of the invention is to provide a new and improved edge treatment which reduces or eliminates the problem of "fibre raising" when colorants or other liquid sealing agents are applied in finishing operations.

Still another object of the present invention is to provide a new and improved edge treatment which permits the use of non-recurring wood grain designs that very closely resemble real wood after finishing is complete.

Another object of the present invention is to provide a new and improved edge treatment wherein design details such as "wood graining" is readily obtainable whereas heretofore rotary or fixed edge cutters as used were incapable of producing such detail, except in a repeating or recurring pattern which was readily discernable to a casual observer.

Yet another object of the present invention is to provide a new and improved edge treatment wherein non-recurring or non-repetitive patterns can be utilized and wherein a wide variety of die shapes may be utilized for almost an infinite variety of patterns and shapes along a profiled edge surface.

Yet another object of the present invention is to provide a new and improved treatment for fibreboard panels and the like which reduces finishing time on the panel edges and which reduces the number of ground coats of other coloring or decorative pattern applications required.

Yet another object of the present invention is to provide a new and improved panel edge treatment for fibreboard panels and the like which results in a finished product that closely resembles actual wood.

Yet another object of the present invention is to provide a new and improved edge treatment of the character described which produces a heat seared skin over the edge surface profile.

Yet another object of the present invention is to provide a new and improved edge treatment for fibreboard panels and the like which results in a finished product with a highly improved, more realistic appearance and more particularly a profiled edge surface having an almost infinite variety of decorative possibilities.

Another object of the present invention is to provide a new and improved edge treatment for cellulosic fibreboard panels and the like wherein a profiled edge may be decorated by printing, painting, staining and the like without requiring additional base coats to be applied after the treatment in accordance with the invention.

SUMMARY OF THE INVENTION

A new and improved edge treatment for fibreboard panels and the like for use as drawer fronts, table tops, furniture tops, shelves, cabinet doors, door and window trim, baseboards and a wide variety of other uses comprises the process of mechanically preshaping a profiled edge surface of a fibreboard blank to a shape approximating a finished edge shape that is desired. The surface of the fibres on the preshaped edge profile is heated and the fibres are seared to form a skin by the application of a heated molding die which is elevated in temperature to a range sufficient to form the seared skin. The heated die compresses and displaces the wood fibres and bonds them together to form a sealed surface. In accordance with one feature of the invention, before the heat searing and pressure deformation is accomplished, the preshaped profiled edge surface may be covered with a heat dryable, liquid sealer or release agent and after the subsequent process of heating and pressurized sealing is completed, a printed pattern or other decorative pattern may be applied without necessitating the application of an additional ground color or base coat.

The novel panel edge treatment in accordance with the present invention permits the use of non-repeating and/or irregular shapes or contours for the edge profile such as random grain patterns having both depressions and raised areas.

Wood fibreboard blanks with mechanically preshaped profiled edges are treated in process apparatus in accordance with the invention which includes one or more moving, heated die elements adapted to pressingly engage opposite edge surfaces of the blanks simultaneously. When producing elongated trim stock such as baseboard, the apparatus may be specifically adapted for longitudinal step by step heated pressure application to a strip or blank which is fed longitudinally through the apparatus. The improved surface treatment of the profiled edge surfaces of fibreboard panels and the like in accordance with the invention facilitates the final decorative work and ultimately results in a finished product that may closely resemble actual wood if a wood grain pattern is selected or any other of a variety of designs.

BRIEF DESCRIPTION OF THE DRAWINGS

For a better understanding of the present invention, reference should be had to the following detailed description taken in conjunction with the drawings, in which:

FIG. 1 is a fragmentary, vertical sectional view of a new and improved apparatus for edge treatment of fibreboard panels and the like in accordance with the features of the present invention;

FIG. 2 is another vertical sectional view of the apparatus illustrating the heat searing die member in a pressure contact position against a profiled edge surface of a fibreboard panel or the like;

FIG. 3 is a fragmentary sectional view taken substantially along lines 3—3 of FIG. 2; and FIG. 4 is a transverse vertical cross-sectional view similar to FIG. 2 but illustrating a dual edging apparatus adapted to simultaneously process both opposite sides of a fibreboard panel or the like.

DESCRIPTION OF THE PREFERRED EMBODIMENTS

More and more, door panels, table tops, furniture tops, shelves, drawer fronts, moldings, baseboards, trim elements and the like are being fabricated from manmade material comprising cellulosic wood fibres or chips compressed into sheets and commonly known as hardboard, fibreboard, particle board, chipboard, flake board and the like. The material known as hardboard is generally a relatively high density board made of wood or plant fibres and the like and is produced either in a dry process wherein additional resinous material is added to the fibres or in a wet process wherein little or no additional resinous material is added. In the latter process, a wetted matt of fibres is compressed under heat and pressure to form the sheets of material. High density fibreboard or hardboard often has densities in the range of 50-70 pounds per cubic foot whereas a medium density material, often known as fibreboard, has densities in the range of 30-50 pounds to the cubic foot. This material generally sold under the term fibreboard is normally produced in a dry process under somewhat lower temperatures and pressures than in the high density hardboard and binding resinous material is added to the processed wood fibres in the process to cement and bind the fibres together. Low density lightweight fibreboard is often used as insulating board and the like and this material has a density in the range of from 10-40 pounds per cubic foot. Man-made sheet material known as particle board is formed of sized wood chips and a binding resin and this material is also sold as "chip board" or "flake board" and is relatively dense and coarsely grained.

There has been an increasing usage of hardboard and fibreboard as well as particle board for furniture parts and finishing surfaces for buildings and the like and the outer surfaces of these materials are decorated by embossing, printing, painting, staining and other types of coloring material. However, many such materials do not support good finishing characteristics on their contoured or profiled edges because of a variety of reasons including general roughness or graininess caused when the profiled edges are cut to shape with rotary planers or shapers and fixed edge knives. In addition, the cut edges are often susceptible to a phenomenon known as "wicking" or "strike in" wherein the applied ink, paint, or stain is more readily absorbed in some portions of the surface than in others and this results in unaesthetic appearance of the material. In addition, during the decorative or finish treatments, some of the fibres may absorb liquid colorant material and then swell up or "raise" thus, distorting the surface pattern desired and causing flaws or unsightliness in the overall appearance of the work. Fibreboard and particle board used in furniture, drawer fronts, cabinets, doors and the like generally requires mechanical preshaping with a shaper or planer to form a profiled edge and subsequently it is then necessary to fill the preshaped edges with a wood filler material. Thereafter sanding operations are required to smooth out the surface properly before further finishing operations can proceed. Often times, in order to avoid filling and sanding, laminates and veneers are used on exposed edges and this has limitations in that laminating material is sometimes costly and difficult to apply and does not always provide an exact match with adjacent non-laminated surface portions of the panels, drawer fronts etc. Particle board in particular, normally requires extensive hand filling and sanding work along profiled edges and when particle board is used in furniture parts, laminants or veneers are provided to reduce the hand work that is generally required. Medium and high density fibreboards have been somewhat more widely used than particle board because these materials require less hand filling and sanding but often times, substantial hand work is still required and laminates or veneers are sometimes substituted.

In accordance with the present invention, widely available medium range density fibreboards and high density hardboards are economically useful. The materials are preshaped to form contoured, profiled edges and these edge surfaces are treated in a manner which reduces or eliminates the necessity for time consuming and expensive hand filling and sanding operations. The profiled edge surface in accordance with the present invention, is extremely advantageous over those produced in accordance with the prior art because of the ease of and reduction of further finishing operations and because of improved appearance. Heat and pressure is applied to preshaped contoured edge profiles of fibreboard blanks to sear and burn the exposed fibre ends and shape or deform these fibres to provide a sealed skin or crust on the outer surface. The surface thus formed, eliminates the need for hand filling and sanding operations and provides positive sealing of the exposed fibre ends so that "wicking" or "strike in" does not occur and in addition better paint "hold out" characteristics are provided. In addition, the sealed skin formed by heat and pressure application greatly reduces or eliminates "fibre raising" because of excess absorbtion of colorants.

Referring now to the drawings, therein is illustrated a new and improved panel edge treating apparatus referred to generally by the reference numeral 10 and including a table-like base or main frame structure 12 having one or more parallel elongated key ways 12a in the upper surface. The base 12 provides support for one or more plattens 14 having depending key portions 14a mounted to slide within the key ways 12a of the base so that the plattens are movable horizontally as indicated by the arrows "A" (FIGS. 1, 2 and 4). Adjustment of the position of the plattens 14 on the supporting base structure 12 is accomplished by a plurality of threaded lead screws 16 and lock nuts 18 are provided to bear against the inside and outside vertical edges of the plattens. Once the plattens are positioned at the desired point on the supporting base structure 12, a plurality of threaded cap screws 20 or other suitable fasteners are utilized to fixedly retain the plattens in the position selected.

In accordance with the present invention, work pieces comprising blanks 22 of pre-sized fibreboard material of appropriate thickness and having a preshaped contoured profiled edge surface 22a are placed in a work position as shown on an upper surface 14b of the plattens 14. The contoured profiled edges 22a of the fibreboard blanks 22 are preshaped by use of mechanically driven rotary cutters or planers or fixed edge knife-type cutters and the preshaped profile closely approximates but is slightly larger than the desired final profile shape or pattern that ultimately results in the fully decorated finished product. In order to properly align the profiled edges 22a of a work piece on the supporting plattens 14, each platten is provided with a plurality of edge guide pins 24 seated in openings formed in a line at spaced apart intervals adjacent an inwardly facing vertical edge of the platten. The alignment pins 24 are rounded on their upper end portions and are biased upwardly by coil springs 26 so that the rounded ends normally extend upwardly above the adjacent upper surface 14b of the platten as shown in FIG. 1. The fibreboard work pieces with preshaped contoured edges 22a are placed into contact with the upstanding guide pins with the lower edge portions of the work pieces manually pressed against the sides of the upwardly projecting alignment pins as shown.

In accordance with the invention, the apparatus 10 includes one or more elongated die members 28 having a lower contoured or profile die face 30 of the desired, appropriate design or pattern for producing the finished edge contour on the work pieces. The patterns or shapes of the die surface 30 need not be a repeating type pattern and accordingly, can comprise an almost infinite variety of different design and pattern configurations such as wood grains, etc. The die element is heated with an elongated electrical heater element 32 mounted in an internal bore formed in the die member and the heater is thermostatically controlled and set to maintain a desired die surface temperature in the range of 500° F.–600° F., for heat searing and sealing of the fibre ends of the contoured profiled edge surface 22a of the blanks or work pieces 22. It has been found that die surface temperatures of 500° F. and greater are desirable for effecting the desired heat searing action and fibre sealing which forms a skin-like crust on the edge surface of the fibreboard panel element. The electric heater 32 maintains the contoured die molding surface 30 of the heated die element at the temperature level in the desired range of 500° F.–600° F. with a median desirable temperature of approximately 550° F.–560° F. being particularly effective and minimizing the time required for heat searing without much chance of charring or burning. It has been found that a temperature of 550° F. is ideal for effecting the heat searing fusion of the fibre ends to form a smooth skin surface over the contoured profiled edge 22a having the desired characteristics previously mentioned. Dependent upon the density of the fibreboard work piece 22 being treated, it has been found that a die contact pressure between the die surface 30 of the heated die member 28 and the preshaped profiled edge surface 22a of the work piece in a range of 400–600 psi is desirable, particularly with fibreboards having density ranges of 30–50 pounds per cubic foot. With higher density hardboards (40–70 pounds per cubic foot) and the like, higher contact pressure ranges of 600–800 psi and up to 1200 psi may be desirable in order to reduce the amount of time required for effecting the heat searing skin formation process as described.

The heated die elements 28 are removably attached to a movable die support member 34 by means of a plurality of mounting bolts 36 and lock nuts 38. The mounting bolts or studs 36 extend upwardly from an upper face of the die element through spaced holes formed in a lower bar segment or bottom element 34a of the die support member. The lower surface of the support element 34a is formed with a key way in order to accommodate a key-like projection 28a formed on the upper surface of the die element 28, and a heat insulating gasket 40 is provided between the die support member 34 and the die element to prevent the die support from reaching excessive temperatures during operation.

The surface 30 of the die element 28 is movable between a ready position of FIG. 1 spaced above the preshaped profiled edge surface 22a of a work piece 22 and a pressure contacting position as shown in FIG. 2 wherein the surface of the die is pressed into heat searing high pressure embossing or molding engagement with the edge surface profile. In this working position, it will be noted that the work piece 22 is forced downwardly against the upper surface 14b of the platten 14 and a heel portion 30a of the die surface is adapted to engage and deflect the guide pins 34 downwardly into a recessed position as shown in FIG. 2. Precision molding and shaping of the work piece surface 22a is achieved when the heel portion 30a seats against the upper surface 14b of the platten 14 as shown. Depending upon the temperature of the heated die face 30 and the density of the hardboard panel 22 being processed, the time interval or dwell time with the die in the heat searing, high pressure, contact position of FIG. 2 may range from 5 to 30 seconds. For example, with a die surface temperature of approximately 550° F. with a medium density fibreboard panel 22 (30–50 pounds per cubic foot), contact pressure in the order of 600 psi and a 15 second dwell time interval is found sufficient to provide the desired seared skin surface formation on the panels or work pieces 22. By increasing the contact pressure and/or increasing the working temperature, the time interval may be lowered, however, with higher operating temperatures charring or burning of the profiled edge surfaces 22a may occur if the contact or dwell time is not watched closely.

The die support member 34 is guided for movement toward and away from the work piece 22 by means of one or more parallel, downwardly sloping key ways 42a of "T"-shaped cross-section which are formed in a downwardly sloping guide member 42. The guide extends upwardly from the upper surface of the platten 14 and the key ways 42a are provided at appropriately spaced intervals in the upper face dependent upon the length of the die member 28. Similarly, the number of threaded adjustment rods 16 aligned with the center of each key way is dependent upon the length of the die member. The die support member 34 is provided with a downwardly depending projection 34b on the lower face which key is slideable within the key way 42a of the guide support 42.

The guide support 42 is secured in sloped position at a desired angle by pairs of upstanding, spaced apart, parallel, brackets 44 disposed on opposite sides of the threaded rods and key ways as best shown in FIG. 3. Adjacent the upper end portions, the brackets support a relatively, large heavy base plate 46 which is adapted to support the base or feet of a high pressure, hydraulic cylinder 48 secured in place by bolt and nuts 50. The cylinder(s) include a piston rod 48a which is connected to the die support member 34 as illustrated in FIG. 2, and when the upper end of the cylinder 48 is supplied with pressurized fluid, the piston rod, die support and die 28 are moved downwardly in a precisely controlled manner from the ready position of FIG. 1 to the pressure contact or molding position of FIG. 2 for heat searing the profiled edge surfaces 22a of a fibreboard blank or work piece 22 in position on the upper surface 14b of the plattens 14. After the heat searing skin formation process is completed, the hydraulic cylinder 48 is pressurized to retract the die member 28 upwardly away from contact with the surface 22a of the work piece 22.

Referring now to FIG. 4, therein is illustrated a multiple head type edge finishing apparatus referred to generally by the reference numeral 10A and which is similar in most respects to the single head apparatus 10 previously described except for the fact that at least one pair of opposing die elements 28 are included in order to treat the opposite edge surfaces 22a of a work piece 22 simultaneously. It is also to be understood that an edge treatment apparatus could be provided with two pairs of opposing die members so that all four sides of a rectangular or square shaped work piece 22 could be treated simultaneously. The improved edge surface treatment in accordance with the present invention is accomplished with medium density fibreboard work pieces 22 having mechanically preshaped profiled or contoured edges which are further treated in an apparatus 10 or 10A as described with the heated die surfaces 30 maintained in a temperature range of approximately 500° F. to 600° F. with an optimal temperature of about 550° F. Dependent upon the amount of detail in the face of the embossed die surface 30, contact pressures ranging from 400 to 600 psi are utilized and the time interval of pressure contact generally varies from about 15 to 30 seconds at these pressure and temperature ranges. With these parameters, an excellent sealed skin formation is established on the profiled edge surfaces 22a of medium density fibreboard work pieces 22. When higher density fibreboard or hardboard work pieces are used, somewhat higher temperature ranges and higher contact pressures are utilized to maintain substantially the same time interval range for completing the heat searing process to mold and seal the surface. With elongated work pieces, such as trim elements or baseboards, the die member 28 is generally somewhat longer and the work pieces are fed linearly into position for contact with the die, and are advanced longitudinally in incremental steps approximately equal to the length of the die member.

It has been found that medium density fibreboard work pieces having preshaped, mechanically formed profiled edge surfaces 22a and treated as set forth herein can provide finished furniture parts of high quality and appearance at relatively low cost. A thin skin or coat is formed by the heat searing and sealing of the fibre ends so that "wicking" or paint "strike in" is virtually eliminated. In addition, the requirement for expensive and time consuming hand filling and sanding operations as well as the requirement for multiple ground coats is also eliminated or reduced to a minimum. Moreover, little or no "grain raise" is encountered and the "paint hold out" characteristics are extremely good. Because non-repeating patterns may be used, fine edge details (not possible with rotary or fixed edge type cutters) are a reality and in this light, wood grain patterns with depressed and raised portions are easily obtained.

In accordance with another feature of the present invention, the preshaped edge profiles 22a of the work pieces 22 are coated with a thin sealer in the form of a ground coat which may be pigmented and aids in the heat searing and sealing process in forming a skin or coat of improved physical and appearance characteristics as described. Such sealers can also include various types of release agents, such as polydimethyl siloxane. Mold lubricants for example, such as acrylic polymers may also be used and a wide variety of lubricants and sealers and releasing agents can be applied to the mechanically preshaped edge surfaces 22a as long as these materials can withstand the subsequent temperatures involved ranging up to a maximum of approximately 600° F. It has been found that when a sealer coat is applied with a pigment therein, no additional ground coats may be required or the number needed can be reduced. The applied pigmented sealer acts as the ground coat and aids in the skin formation on the profiled edges. Subsequent finishing operations, including printing, painting or staining can be applied directly over the heat seared surface when released from the die member 28. This process, of course, provides an economic advantage and the finished articles have a greatly improved appearance over prior art articles.

More particularly, when a wood grain pattern is desired, a fibreboard blank or work piece 22 is treated in accordance with the apparatus 10 or 10A of the present invention and the finished product faithfully resembles in great detail an actual wood piece. It should also be noted that initially when the work pieces 22 are mechanically preshaped with a router or a rotary cutter, the preshaped profile should be slightly expanded over that profile which is ultimately desired in the finished product so that the wood fibres of the work piece may be compressed and sealed together by the heat and contact pressure of the heated die element face 30. In this embossing process some of the wood fibres may be mechanically raised or lifted outwardly of the initial surface into the cavities of the die face and other fibres may be compressed together inwardly and are displaced by the high contact pressure and heat provided.

From the foregoing it will be seen that the new and improved edge treatment for fibreboard blanks in accordance with the present invention results in a finished product having a better, more realistic appearance and yet is lower in cost and is available with a much greater range of shapes and patterns than heretofore possible.

Although the present invention has been described with reference to several illustrated embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A panel of compressed wood fibreboard having a plurality of profiled edge surfaces formed by:
   cutting to mechanically pre-shape said edge surfaces of said blank to approximate a finished edge profile shape desired rendering said profiled edge surfaces porous and therein more liquid absorbant and less uniform liquid absorbant condition than in the prior un-cut condition;
   elevating the surface temperature of said preshaped edge surfaces to a temperature of at least 500° F. to heat sear the fibres of substantially only said pre-shaped edge surfaces of said wood fibreboard; and
   pressurizing said heat seared edge profile while at said elevated temperature to sufficient forming pressure for sealing together adjacent wood fibres of substantially only said preshaped edge surfaces into a permanent set of the desired edge profile, said profiled edge surfaces having a reduced liquid absorption and more uniform capacity for liquid absorption therein.

2. The panel of claim 1 including a ground coat of liquid sealer applied over said profiled edge surface before the searing and compression of said wood fibres to form said sealed outer surface, said decorative pattern being applied over said ground coat subsequent to said searing and compression of said wood fibres.

3. The panel of claim 2 wherein said decorative pattern is a printed pattern.

4. The panel of claim 3 wherein said profiled edge surface is formed with ridges and valleys arranged to represent a wood grain structure and said decorative pattern is arranged to highlight said wood grain structure.

5. The panel of claim 1 including a back surface intersecting said profiled edge surface and a front surface opposite said backing surface intersecting said profiled edge surface, said decorative pattern being applied onto said front surface adjacent said profile edge surface.

6. The panel of claim 5 including at least one pair of said profiled edge surfaces along opposite edges of said front surface.

7. The panel of claim 6 wherein said profiled edge surfaces of said pair are in general parallel of one another and slope downwardly and oppositely outwardly away from said front surface to intersect said back surface.

8. The panel of claim 7 wherein said profiled edge surfaces of said pairs include concave and convex portions running generally parallel.

9. The panel of claim 1 wherein said profiled edge surface includes a concave and a convex portion running generally parallel.

10. The panel of claim 9 wherein said concave and convex portions extend angularly away from a front face of said panel.

11. The panel of claim 1 wherein said adjacent fibres of said edge surface are seared and compressed together at a temperature of at least 500° F. while being compressed.

* * * * *